Oct. 6, 1942.                L. C. SWIM                2,297,992
                     ADJUSTABLE LOW-BED VEHICLE
                        Filed Dec. 2, 1941
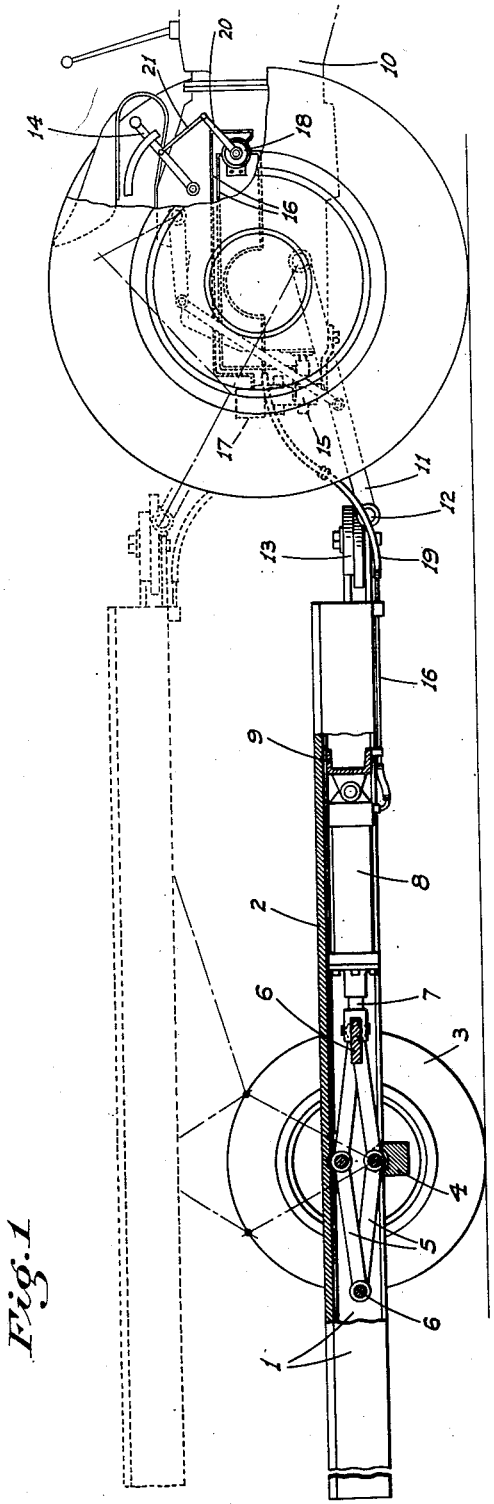
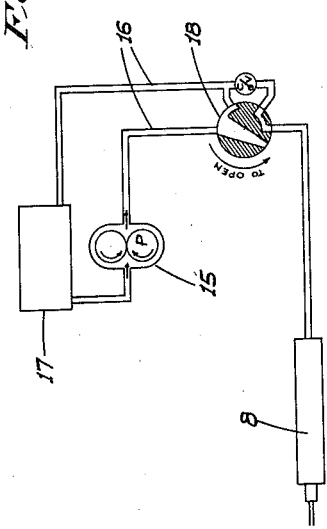
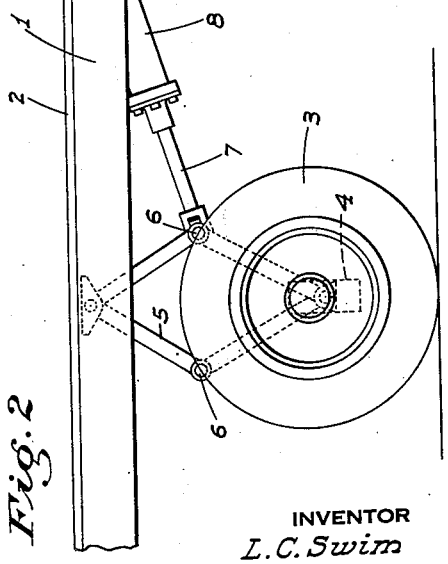
INVENTOR
L. C. Swim
BY
Webster & Webster
ATTYS

Patented Oct. 6, 1942

2,297,992

UNITED STATES PATENT OFFICE 2,297,992

ADJUSTABLE LOW-BED VEHICLE

Lowell Charles Swim, Modesto, Calif.

Application December 2, 1941, Serial No. 421,267

7 Claims. (Cl. 280—33.4)

This invention relates to low-bed vehicles particularly adapted for orchard use, to transport loaded boxes of fruit and the like from the field to a road truck or loading platform.

The principal object of my invention is to provide an adjustable bed vehicle of this type, so constructed that the loading of the boxes onto the vehicle and the subsequent unloading of the same onto a truck or the like is greatly facilitated, and considerable time and labor is saved. Also, the actual number of boxes in vertically stacked relation on the vehicle may be relatively large without the boxes interfering with the overhang of trees in the orchard, and which limits the total height of any vehicle and load which may be successfully handled in an orchard.

A further object is to provide a vehicle especially designed for attachment to a certain standard tractor having a vertically adjustable drawbar, and whose upward and downward movement aids the raising and lowering of the vehicle bed and maintaining the same on a level. Such a tractor includes a hydraulic hand-controlled mechanism to operate the drawbar, and a further object of this invention is to provide a hydraulic raising unit for the bed, to take the greatest portion of the load thereon, and a control means for such mechanism connected to the control member of the drawbar mechanism in such a manner that both mechanisms will work simultaneously, and the bed will be raised and lowered while remaining horizontal at all times.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a side elevation, partly in section and broken away, of my improved low-bed vehicle in a lowered position and as connected to the adjustable drawbar of a tractor.

Figure 2 is a fragmentary side elevation of the vehicle, showing the bed fully raised.

Figure 3 is a diagram of one form of control means for the hydraulic unit of the bed.

Referring now more particularly to the characters of reference on the drawing, the vehicle comprises a bed having side frames 1 and a flooring 2 above the frames, which extends unbrokenly from side to side of the bed so as to provide an unbroken, continuous load supporting area. The bed is supported intermediate its ends and preferably just back of center by a pair of wheels 3 mounted on an underslung axle 4. Two pairs of transversely spaced, pantograph link units 5 are connected at top and bottom on the frames 1 and axle respectively, the units being connected to each other at their intermediate pivot points by cross members 6.

Connected to the forward cross member intermediate its ends is the piston rod 7 of a hydraulic cylinder 8, which is pivoted at its forward end on a cross beam 9 extending between and rigid with the frames 1. When the linkage is fully collapsed, the bed frames rest on the axle and no load is taken thereby, this being the loading and transporting position of the bed. The piston is then retracted in the cylinder. The linkage may be extended to such an extent as to raise the bed well clear above the wheels, so that the flooring 2 of the bed is unobstructed from side to side and the load thereon may be slid off the flooring and onto a platform or truck disposed alongside the vehicle, without any lifting of such load.

The vehicle bed is supported at its front end in draft relation with a tractor 10 by the rearwardly projecting pivoted draft arms 11 of the tractor, and which arms are connected by a cross arm 12, as usual. A fifth wheel unit 13 is mounted on the bar and forms a swivel connection and support between said bar and the front end of the bed, permitting steering of the latter and avoiding any tendency to lateral tilting.

The draft arms 11 are raised and lowered by a hydraulic mechanism incorporated in the tractor, and whose operation as usual is controlled by a valve actuated by a pivoted handle lever 14 mounted on the tractor in a position convenient to the operator. The hydraulic pressure generated by the tractor mechanism, however, is not enough to operate the cylinder 8 if any considerable load is on the bed. I therefore provide an additional pressure pump 15, which as here shown is mounted on the tractor and is directly driven from the power take-off shaft at the rear end of the tractor.

The piping system 16 between the pump, cylinder 8, and a supply reservoir 17 includes a rotary control valve 18 of suitable type mounted on the tractor, and a flexible hose 19 extending between the bed and the valve and including a detachable coupling device. The valve 18 has a pivoted hand lever 20 and is mounted sufficiently close to the handle 14 so that it can be readily connected thereto by a link 21.

The levers 14 and 20 will therefore move simultaneously, and the valve 18 is arranged so that as pressure is admitted to the tractor mechanism to raise the draft arms 11, pressure is also admitted to the cylinder 8 to advance the piston rod. This will cause the linkage units 5 to be extended so as to raise the bed in timed relation with the raising of the draft arms 11 so that the bed remains horizontal at all times. The valve 18 is of course arranged to provide for the advance, holding or releasing of the fluid in the portion of the pipe line 16 between the valve and the cylinder 8 so that the bed may be raised to any desired level, held at such level or allowed to drop of its own weight in coordinated relation to the corresponding movements of the draft arms.

The wheels 3 are disposed just back of the center of length of the bed so that the load will be substantially centered at the wheels, and only if weight is placed on the draft arms of the tractor to steady the bed without danger of overloading the control mechanism of said arms.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patents is:

1. In a vehicle and tractor combination, a vehicle bed, a vertically movable drawbar unit on the tractor, means connecting the unit and bed at the forward end of the latter in supporting relation, wheels at the sides of the bed intermediate the ends of the latter, vertically adjustable connection means between the bed and wheels, a movable handle on the tractor controlling the movement of the drawbar, a mechanism mounted in part on the bed to control the movement of the adjustable connection means, a control handle for the mechanism mounted on the tractor and a link connecting the handles to simultaneously move the same whereby to cause simultaneous operation of the drawbar unit and mechanism.

2. A vehicle for trailing attachment to a tractor having a vertically movable drawbar unit, said vehicle including a load supporting bed, means to connect the bed at its forward end and the unit in supported relation, wheels disposed to the sides of the bed intermediate the ends of the latter, a pantograph linkage unit connecting the wheels and bed and collapsed when the bed is lowered, and means connected to the linkage to extend the same.

3. A vehicle as in claim 2, in which the linkage unit is arranged for extension sufficient to dispose the bed above the top of the wheels when the linkage is fully extended.

4. A vehicle for trailing attachment to a tractor having a vertically movable drawbar unit; said vehicle including a load supporting bed, means to connect the bed at its forward end and the unit in supported relation, wheels disposed to the sides of the bed intermediate the ends of the latter, means connecting the wheels and bed for vertical movement of the latter relative to the wheels, means to control such movement and an axle connecting the wheels; the bed including side frames adapted to rest on the axle when the bed is in its lowermost position.

5. A vehicle for trailing attachment to a tractor having a vertically movable drawbar unit, said vehicle including a load supporting bed, means to connect the bed at its forward end and the unit in supported relation, wheels disposed to the sides of the bed intermediate the ends of the latter, an axle for the wheels, a pair of transversely spaced pantograph linkages connected at top and bottom with the axle and bed, cross bars connecting the linkages intermediate the top and bottom thereof, and power means applied to one bar to extend the linkages.

6. A vehicle as in claim 5, in which said power means comprises a hydraulic cylinder having a piston rod projecting from one end thereof, the outer end of the rod being connected to said cross bar, and means pivoting the cylinder at its opposite end on the bed.

7. A vehicle as in claim 2, in which the bed includes a load supporting floor extending from side to side thereof, the linkage unit being disposed under said floor.

LOWELL CHARLES SWIM.